Feb. 13, 1951  J. W. CARL  2,541,403
DISH CONVEYING MACHINE
Filed March 24, 1947  3 Sheets-Sheet 1

INVENTOR.
JOHN W. CARL
BY Hazard and Miller
Attorneys

Feb. 13, 1951 — J. W. CARL — 2,541,403
DISH CONVEYING MACHINE
Filed March 24, 1947 — 3 Sheets-Sheet 3

INVENTOR.
JOHN W. CARL
BY Hazard and Miller
Attorneys

Patented Feb. 13, 1951

2,541,403

UNITED STATES PATENT OFFICE 2,541,403

DISH CONVEYING MACHINE

John W. Carl, Alhambra, Calif.

Application March 24, 1947, Serial No. 736,843

6 Claims. (Cl. 198—230)

This invention relates to a conveyor suitable for conveying soiled dishes to a spillway or deck which may be adjacent a dishwashing machine.

An object of the invention is to provide a conveyor which is of such construction that it may be readily installed behind a counter on which meals are adapted to be served, enabling a waitress to easily remove dishes and eating untensils from the counter and to deposit them on the conveyor behind the counter to be conveyed thereby to a point adjacent the location where the dishes are to be washed. To this end the conveyor consists essentially of an endless belt suitably driven and on which the soiled dishes are positioned.

A more specific object of the invention is to provide a means for supporting the upper reach of the endless belt in such a manner that it will convey relatively heavy loads such as may be occasioned by a stack of soiled dishes and in such a manner that elongated articles such as glasses will not be tipped or caused to fall over as they are conveyed which would be apt to result in breakage.

Still another object of the invention is to provide a conveyor for soiled dishes as above described wherein the upper reach of the endless belt is supported by an underlying deck which is constantly fed with a small supply of water that, in effect, is filmed between the conveyor belt and the deck to thus provide a form of lubricant enabling the belt to readily slide over the deck in the course of its movement under load.

Another object of the invention is to provide a conveyor for soiled dishes and the like consisting of an endless belt that is suitably driven and wherein rotary cleaners, such as rotary brushes, are caused to engage both the upper and under sides of the belt so as to constantly clean the belt of material that tends to adhere thereto and wherein the belt is conducted through a sterilizing medium to sterilize it during each cycle of operation.

Another object of the invention is to provide a conveyor for soiled dishes which can be easily and economically constructed and which has rollers or other rotary parts so mounted as to enable them to be easily removed from the machine for inspection, repair, or replacement.

Another object of the invention is to provide a conveyor for soiled dishes, as above described, consisting of an endless belt that is suitably driven and which is so constructed that at any time the belt can be raised to allow for easy access to the underlying deck for cleaning, either by flushing or scrubbing, so as to pass the health and safety laws of any State.

With the foregoing and other objects in view, which will be made manifest in the following detailed description and specifically pointed out in the appended claims, reference is had to the accompanying drawings for an illustrative embodiment of the invention, wherein:

Figure 1:
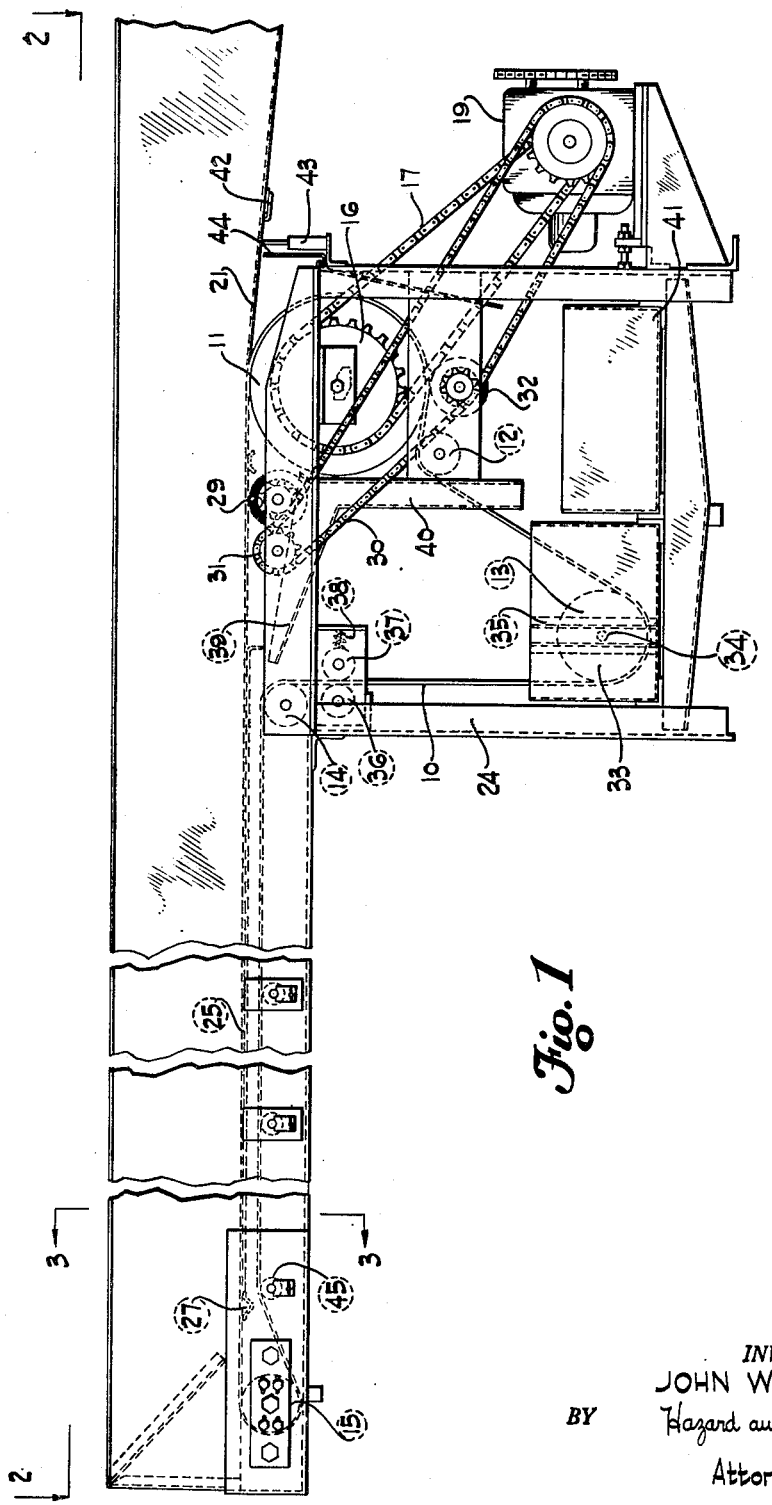
Figure 1 is a view in side elevation, parts being broken away, illustrating essential elements of the conveyor embodying the present invention.
Figure 2:
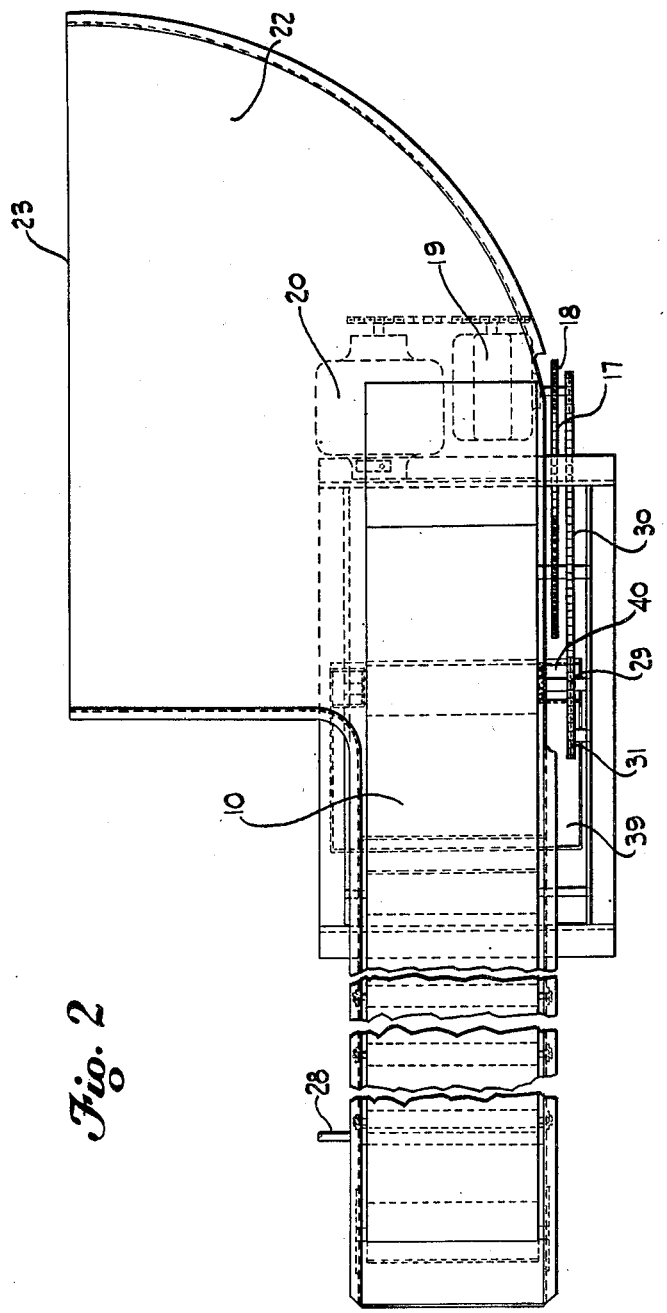
Fig. 2 is a top plan view of the same.

Referring to the accompanying drawings wherein similar reference characters designate similar parts throughout, the improved conveyor consists essentially of an endless belt 10 which is trained over a relatively large drive roller 11 and over idler rollers 12, 13, 14 and 15. The drive roller 11 has a sprocket 16 rigid therewith over which an endless drive chain 17 is trained. This drive chain, in turn, is driven by a sprocket 18 on the output shaft of a gear box 19 that is driven such as by an electric motor 20 so that as the drive roller 11 is driven the belt 10 is caused to progress about the various idler rollers through a path as indicated on Fig. 1. The upper reach of the endless belt that extends between the top of the idler roller 15 and the top of the drive roller 11 provides a supporting surface on which soiled dishes, glasses, cups, eating utensils and the like, may be positioned to be carried thereby onto a drive roller door 21 and onto a laterally sloping spillway or receiving deck indicated at 22 which slopes downwardly toward the edge 23 which may be located adjacent a dish-washing machine or other apparatus where these articles are adapted to be washed. The length of the conveyor is indefinite and may extend the complete length behind a serving counter and as the means of installation will vary with different designs of serving counters, the supports for the conveyor other than the legs 24 have not been illustrated.

Figure 3:
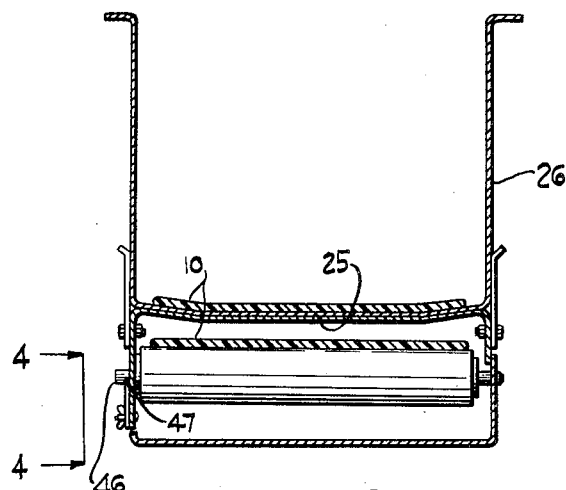
Fig. 3 is a vertical section taken substantially upon the line 3—3 upon Fig. 1.

As a means for supporting the upper reach of the endless belt 10 between the idler roller 15 and the drive roller 11, a supporting deck 25 is positioned therebeneath. This supporting deck consists of a suitable section of sheet metal that extends the complete width of the belt and, as illustrated in Fig. 3, it is preferably transversely troughed or dished. This deck may be integral with and be provided by the bottom of a trough, the sides of which are indicated at 26. The forward end of the deck 25 is so formed as to provide a transversely extending groove 27 which is designed to hold a small amount of water that is continuously fed slowly through a supply pipe or tube 28. In the course of movement of the belt 10 the belt on passing over the filled trough 27 will have its under surface coated with a film of water which is carried by the belt and spread over the upper surface of the deck 25, thus providing a water film which acts as a lubricant between the belt and the deck reducing friction between these parts so that the belt may readily slide on the deck even though heavily loaded with dishes. The deck 25 extends to a point a short distance forwardly of the drive roller 11.

In the space between the drive roller 11 and the rear end of the deck 25 there is disposed a rotary brush 29 having a sprocket rigid therewith which is driven by a brush driving chain 30. This brush driving chain is trained over an idler sprocket 31 and over a sprocket on a second rotary brush 32 that is arranged beneath the drive roller 11. The brush driving chain 30 is driven off of a second sprocket on the output shaft of the gear box 19 and when driven the brushes 29 and 30 are rotated to clean not only the upper or exterior surface of the belt 10 but the under or interior surface of this belt. Consequently, any material that may spill from the soiled dishes onto the upper surface of the belt will be cleaned therefrom by the rotary brush 32 and if this material should work its way between the belt and the supporting deck 25 it will be cleaned from the under side of the belt by the rotary brush 29. As a means for sterilizing the belt in the course of its movement, the idler roller 13 is disposed in a tank 33 and is in the form of a heavy weight or a weighted roller with trunnions 34 that are vertically slidable between guides 35 provided on the walls of the tank. The belt, on passing over this roller, is caused to submerge or dip into a sterilizing or antiseptic solution. For this purpose a solution of sodium bicarbonate may be employed which tends to keep the belt sweet at all times. The weight of the roller 13 causes it to also function as a takeup roller, taking up slack in the belt.

As the belt passes around the roller 13 and moves up to the idler roller 14 it passes between two squeezing or wringing rollers 36 and 37. The roller 37 is urged toward the roller 36 such as by springs 38 so that any solution in the tank 33 which is carried with the belt upwardly is squeezed or wrung therefrom by the rollers 36 and 37 and may drop back into the tank 33.

As the belt between the rear end of the deck 25 and the top of the drive roller 11 is unsupported except for the rotary brush 29 there is danger of small articles such as eating utensils slipping between the edges of the belt and the walls 26 of the trough in this locality. To overcome this a collecting trough 39 is supported beneath this portion of the belt and this collecting trough is provided with downwardly extending spouts 40 that straddle the lower portion of the belt and discharge into a container 41. This container preferably has a perforated bottom enabling liquids to drain therethrough but it will retain these various articles that may slip off of the belt in this locality and which are discharged through the spouts 40. These may be retrieved from the container 41 from time to time.

The door 21 has a connection 42 with the body of the spillway or deck 22 that will enable it to swing down by gravity into engagement with the top of the belt as it passes around the drive roller 11. This door is intended to, in effect, peel or scrape the articles on the belt therefrom as the belt passes around the drive roller and to cause the dishes and other articles to slide from the belt onto the inclined deck or spillway 22. It may be, however, that a fork, for example, may be positioned on the belt in an inverted position and that the tines of the fork may enter between the edge of the door 21 and the belt causing the door 21 to lift slightly. To overcome this a microswitch 43 is located beneath the door and is placed in circuit with the electric motor 20. This switch will break the circuit through the motor, stopping the operation of the conveyor whenever the door 21 is lifted. The offending fork or similar article may then be removed from between the belt and the door and, on allowing the door 21 to return to its normal position, the circuit through the motor is again closed and operation of the conveyor may be resumed. As a precautionary measure a wall 44 may be arranged in advance of the microswitch having its lower portion directed downwardly in such a manner as to discharge all material that is brushed off of the belt by the brush 32 into the container 41. Beneath the container 41 there will normally be installed an outlet to a sewer or similar drain.

Rollers 45 are merely supporting rollers mounted beneath the lower reach of the belt and serving to support it between the idler rollers 14 and 15.

Figure 4:
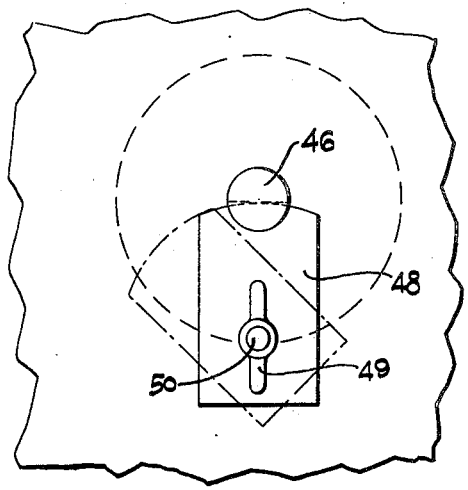
Fig. 4 is a partial view in side elevation illustrating a detail of construction.

In the preferred form of construction each of the rollers 12, 14, and 45, as well as the rotary brushes 29 and 32, have shafts extending therethrough that are mounted on vertical walls of the frame of the machine. These shafts, one of which is indicated at 46 (see Figs. 3 and 4), have slots 47 milled therein. Keepers 48 are mounted on the frame and are retained thereon by means of wing nuts 49 on studs or bolts 50. These keepers, when they occupy the full line position shown in Fig. 4, extend into the slots 47 on the shafts and retain the shafts in proper position. However, on loosening the wing nuts 49 and swinging the keepers laterally or into the dotted line position shown in Fig. 4, the shaft associated therewith can be removed by sliding it endwise out of the frame. In this manner any roller or rotary brush may be easily and quickly removed for purposes of inspection, repair, or replacement.

From the above described construction it will be appreciated that a relatively simple conveyor has been provided which is highly suitable for conveying dirty dishes and the like. This conveyor is so designed as to enable it to be installed behind a serving counter so that dirty dishes can be removed from the counter, positioned on the belt, and carried thereby to the spillway 22 in the neighborhood of the dish-washing machine. Provision is made for cleaning both sides of the belt continuously during each cycle of operation and for sterilizing the belt to keep it sweet and clean.

Various changes may be made in the details of construction without departing from the spirit and scope of the invention as defined by the appended claims.

I claim:

1. A conveyor for dishes and the like comprising an endless belt, means for driving the belt including a driving drum around which the belt passes to be driven thereby, means for supporting the upper reach of the belt so that dishes and the like can be placed thereon and carried thereby, the supporting means stopping short of the driving drum providing a space therebetween, means on the under side of the upper reach of the belt located in the space between the supporting means and the driving drum for cleaning the under side of the belt before it reaches the driving drum, means on the outside of the lower reach of the belt located opposite the bottom of the driving drum for cleaning the outside of the belt, and means located adjacent the end of the supporting means opposite the driving drum for feeding a liquid between the belt and said supporting means as the belt passes thereover.

2. A conveyor for dishes and the like comprising an endless belt, means for driving the belt including a driving drum around which the belt passes to be driven thereby, means for supporting the upper reach of the belt so that dishes and the like can be placed thereon and carried thereby, the supporting means stopping short of the driving drum providing a space therebetween, means on the under side of the upper reach of the belt located in the space between the supporting means and the driving drum for cleaning the under side of the belt before it reaches the driving drum, means on the outside of the lower reach of the belt located opposite the bottom of the driving drum for cleaning the outside of the belt, means located adjacent the end of the supporting means opposite the driving drum for feeding a liquid between the belt and said supporting means as the belt passes thereover, and means for taking up slack in the belt.

3. A conveyor for dishes and the like comprising an endless belt, means for driving the belt including a driving drum around which the belt passes to be driven thereby, means for supporting the upper reach of the belt so that dishes and the like can be placed thereon and carried thereby, the supporting means terminating short of the driving drum providing a space therebetween, means on the under side of the upper reach of the belt located in the space between the supporting means and the driving drum for cleaning the under side of the belt before it reaches the driving drum, means disposed adjacent the drum and the upper reach of the belt for receiving dishes from the upper reach of the belt, and means for cleaning the outside of the belt after the belt passes the last-named means.

4. A conveyor for dishes and the like comprising an endless belt, means for driving the belt including a driving drum around which the belt passes to be driven thereby, means for supporting the upper reach of the belt so that dishes and the like can be placed thereon and carried thereby, the supporting means terminating short of the driving drum providing a space therebetween, means on the under side of the upper reach of the belt located in the space between the supporting means and the driving drum for cleaning the under side of the belt before it reaches the driving drum, means disposed adjacent the drum and the upper reach of the belt for receiving dishes from the upper reach of the belt, means for cleaning the outside of the belt after the belt passes the last-named means, and means located adjacent the end of the supporting means remote from the drum for feeding a liquid between the belt and said supporting means as the belt passes thereover.

5. A conveyor for dishes and the like comprising an endless belt, means for driving the belt including a driving drum around which the belt passes to be driven thereby, means for supporting the upper reach of the belt so that dishes and the like can be placed thereon and carried thereby, the supporting means terminating short of the driving drum providing a space therebetween, means on the under side of the upper reach of the belt located in the space between the supporting means and the driving drum for cleaning the under side of the belt before it reaches the driving drum, means disposed adjacent the drum and the upper reach of the belt for receiving dishes from the upper reach of the belt, means for cleaning the outside of the belt after the belt passes the last-named means, a container, and hopper means disposed above the container and at the sides of the portion of the upper reach of the belt between the end of the supporting means and the drum for directing articles falling off the belt in the container below the hopper.

6. A conveyor for dishes and the like comprising an endless belt, means for driving the belt including a driving drum around which the belt passes to be driven thereby, a support under the upper reach of the belt so that dishes and the like can be placed on the upper reach of the belt and carried thereby, there being upstanding walls at the sides of the support, the support terminating short of the driving drum to provide a space between the drum and the support, the walls of the support continuing alongside the upper reach of the belt, a rotary brush on the under side of the upper reach of the belt and located in the space between the support and the drum for cleaning the under side of the belt before it reaches the drum, a dish-receiving member disposed adjacent the upper reach of the belt and adjacent the drum for receiving dishes from the upper reach of the belt, a rotary brush arranged to engage the outside of the belt after it passes the dish-receiving member for cleaning the outside of the belt, and means for driving the brushes.

JOHN W. CARL.

REFERENCES CITED

The following references are of record in the file of this patent:

UNITED STATES PATENTS

| Number | Name | Date |
|---|---|---|
| 729,512 | Sejnoha | May 26, 1903 |
| 1,255,977 | Bemis | Feb. 12, 1918 |
| 1,728,664 | Comstock | Sept. 17, 1929 |
| 1,824,858 | Williams | Sept. 29, 1931 |
| 1,993,109 | Merritt | Mar. 5, 1935 |
| 2,018,648 | Dinley | Oct. 22, 1935 |
| 2,066,206 | Laurie | Dec. 29, 1936 |
| 2,083,864 | Puckett | June 15, 1937 |
| 2,390,007 | Sherman | Nov. 27, 1945 |